(12) United States Patent
Ponnampalam et al.

(10) Patent No.: US 7,986,712 B2
(45) Date of Patent: Jul. 26, 2011

(54) CELLULAR COMMUNICATION SYSTEM AND METHOD FOR BROADCAST COMMUNICATION

(75) Inventors: Vishakan Ponnampalam, Bristol (GB); Peter Bruce Darwood, Bristol (GB)

(73) Assignee: IPWireless, Inc., San Francisco, CA (US)

( * ) Notice: Subject to any disclaimer, the term of this patent is extended or adjusted under 35 U.S.C. 154(b) by 770 days.

(21) Appl. No.: 11/602,729

(22) Filed: Nov. 20, 2006

(65) Prior Publication Data
US 2007/0165584 A1 Jul. 19, 2007

(30) Foreign Application Priority Data
Nov. 22, 2005 (GB) .................................. 0523710.2

(51) Int. Cl.
*H04J 3/16* (2006.01)
(52) U.S. Cl. ........ 370/468; 370/337; 370/347; 455/450; 455/452.2
(58) Field of Classification Search ................. 455/3.01, 455/3.06, 517–519, 414.3, 11.1, 450–452.2, 455/562.1; 370/328, 338, 329, 468
See application file for complete search history.

(56) References Cited

U.S. PATENT DOCUMENTS

| | | | | |
|---|---|---|---|---|
| 5,166,926 A | * | 11/1992 | Cisneros et al. | 370/392 |
| 6,016,311 A | * | 1/2000 | Gilbert et al. | 370/280 |
| 6,131,034 A | * | 10/2000 | McLaughlin et al. | 455/450 |
| 6,330,459 B1 | * | 12/2001 | Crichton et al. | 455/562.1 |
| 6,687,498 B2 | * | 2/2004 | McKenna et al. | 455/422.1 |
| 7,024,200 B2 | * | 4/2006 | McKenna et al. | 455/452.1 |
| 7,123,910 B2 | * | 10/2006 | Lucidarme et al. | 455/434 |
| 2008/0137562 A1 | * | 6/2008 | Li et al. | 370/280 |

FOREIGN PATENT DOCUMENTS

| | | |
|---|---|---|
| DE | 19629899 C1 | 8/1997 |
| EP | 0930798 A2 | 7/1999 |
| EP | 1122895 A1 | 8/2001 |
| EP | 1361770 A1 | 11/2003 |
| EP | 1505782 A2 | 2/2005 |
| WO | WO-2004/028041 A1 | 4/2004 |
| WO | WO-2004/039100 A2 | 5/2004 |
| WO | WO-2005/101870 A1 | 10/2005 |

OTHER PUBLICATIONS

Holma, H. et al. eds. (2001). *WCDMA for UMTS: Radio Access for Third Generation Mobile Communications.* John Wiley & Sons Ltd.: West Sussex, England, 10 pages (Table of Contents).
Great Britain Search Report for Great Britain Application No. 0523710.2 filed Nov. 22, 2005, 1 page.
International Search Report and Written Opinion mailed Mar. 23, 1007, for PCT Application No. PCT/EP2006/068242 filed Nov. 8, 2006, 13 pages.
Walke, B. H. et al. (2003). "Spectrum Issues and New Air Interfaces," *Computer Communications* 26:53-63.

* cited by examiner

*Primary Examiner* — Sharad Rampuria
(74) *Attorney, Agent, or Firm* — Fitch Even Tabin & Flannery

(57) ABSTRACT

A cellular communication system comprises a management function having a broadcast mode function; a plurality of wireless serving communication units operably coupled to the management function; and a plurality of wireless subscriber communication units receiving signals from respective wireless serving communication units in an uni-cast mode of operation on a frequency channel comprising a plurality of downlink transmission resources. The broadcast mode function applies a common cell identifier associated with broadcast transmissions from the plurality of wireless serving communication units thereby signalling to the plurality of wireless subscriber communication units that part or all of the transmission resource is to be configured or re-configured for broadcast mode of operation.

33 Claims, 5 Drawing Sheets

CELLULAR COMMUNICATION SYSTEM AND METHOD FOR BROADCAST COMMUNICATION

CROSS-REFERENCE TO RELATED APPLICATIONS

This application claims the benefit of United Kingdom patent application number 0523710.2, filed Nov. 22, 2005, which is incorporated by reference in its entirety herein.

FIELD OF THE INVENTION

The invention relates to utilisation of communication resources in cellular communication systems and in particular, but not exclusively, to supporting broadcast communication in a time-division duplex $3^{rd}$ Generation Partnership Project (3GPP) cellular communication system.

BACKGROUND OF THE INVENTION

Currently, 3rd generation cellular communication systems are being rolled out to further enhance the communication services provided to mobile phone users. The most widely adopted 3rd generation communication systems are based on Code Division Multiple Access (CDMA) and Frequency Division Duplex (FDD) or Time Division Duplex (TDD) technology. In CDMA systems, user separation is obtained by allocating different spreading and/or scrambling codes to different users on the same carrier frequency and in the same time intervals. This is in contrast to time division multiple access (TDMA) systems, where user separation is achieved by assigning different time slots to different users.

In addition, TDD provides for the same carrier frequency to be used for both uplink transmissions, i.e. transmissions from the mobile wireless communication unit (often referred to as wireless subscriber communication unit) to the communication infrastructure via a wireless serving base station and downlink transmissions, i.e. transmissions from the communication infrastructure to the mobile wireless communication unit via a serving base station. In TDD, the carrier frequency is subdivided in the time domain into a series of timeslots. The single carrier frequency is assigned to uplink transmissions during some timeslots and to downlink transmissions during other timeslots. An example of a communication system using this principle is the Universal Mobile Telecommunication System (UMTS). Further description of CDMA, and specifically of the Wideband CDMA (WCDMA) mode of UMTS, can be found in 'WCDMA for UMTS', Harri Holma (editor), Antti Toskala (Editor), Wiley & Sons, 2001, ISBN 0471486876.

In a conventional cellular system, cells in close proximity to each other are allocated non-overlapping transmission resources. For example, in a CDMA network, cells within close proximity to each other are allocated distinct spreading codes (to be used in both the uplink direction and the downlink direction). This may be achieved by, for example, employing the same spreading codes at each cell, but a different cell specific scrambling code. The combination of these leads to effectively distinct spreading codes at each cell.

In order to provide enhanced communication services, the 3rd generation cellular communication systems are designed to support a variety of different and enhanced services. One such enhanced service is multimedia services. The demand for multimedia services that can be received via mobile phones and other handheld devices is set to grow rapidly over the next few years. Multimedia services, due to the nature of the data content that is to be communicated, require a high bandwidth.

Typically, in such cellular systems that employ a single carrier frequency, a wireless subscriber unit is 'connected' to one wireless serving communication unit, i.e. one cell. Other cells in the network typically generate interfering signals to the wireless subscriber unit of interest. Due to the presence of these interfering signals a degradation of the maximum achievable data rate, which can be maintained to the wireless subscriber unit, is typical.

The typical and most cost-effective approach in the provision of multimedia services is to 'broadcast' the multimedia signals, as opposed to send the multimedia signals in an uni-cast (i.e. point-to-point) manner. Typically, tens of channels carrying say, news, movies, sports, etc. may be broadcast simultaneously over a communication network.

As radio spectrum is at a premium, spectrally efficient transmission techniques are required in order to provide users with as many broadcast services as possible, thereby providing mobile phone users (subscribers) with the widest choice of services. It is known that broadcast services may be carried over cellular networks, in a similar manner to conventional terrestrial Television/Radio transmissions.

Technologies for delivering multimedia broadcast services over cellular systems, such as the Mobile Broadcast and Multicast Service (MBMS) for UMTS, have been developed over the past few years. In these broadcast cellular systems, the same broadcast signal is transmitted over non-overlapping physical resources on adjacent cells within a conventional cellular system. Consequently, at the wireless subscriber unit, the receiver must be able to detect the broadcast signal from the cell it is connected to. Notably, this detection needs to be made in the presence of additional, potentially interfering broadcast signals, transmitted on the non-overlapping physical resources of adjacent cells.

In addition, digital video broadcasting (DVB) technologies have recently evolved and are targeted at delivering broadcast video to mobile handheld (DVB-H) terminals. Typically, all wireless infrastructure transmitters in such networks operate as wireless 'repeaters'. Hence, a separate and distinct technology, usually a cellular phone technology, is used to provide uplink and downlink uni-cast signals (which are required to carry control signalling and uplink user traffic) to facilitate broadcast communications to the DVB-H terminal using DVB. Although it is possible to integrate DVB-H receivers for such broadcast systems into a mobile phone, the cost of such 'dual-mode' devices will be significant.

Thus, all known techniques proposed or implemented for broadcast wireless transmissions require either separate spectrum dedicated for broadcast purposes inefficiently. Alternatively, the known techniques propose or implement duplicate circuitry in the mobile receiver to receive distinct broadcast and uni-cast transmissions at respective frequencies, again somewhat inefficiently with respect to broadcast transmissions.

Thus, typically in a cellular network, in order to achieve the high bandwidths envisaged for broadcast transmissions, there is a requirement to mitigate interference from neighbouring cells in order to achieve the high throughput rates required for a broadcast transmission.

Consequently, current techniques are suboptimal. Hence, an improved mechanism to address the problem of supporting broadcast transmissions over a cellular network would be advantageous. In particular, a system allowing for the provision of broadcast transmissions in an UTRA TDD system to co-exist with the existing UTRA-TDD system would be advantageous.

SUMMARY OF THE INVENTION

Accordingly, the invention seeks to mitigate, alleviate or eliminate one or more of the abovementioned disadvantages singly or in any combination.

According to a first aspect of the invention, there is provided, a cellular communication system. The cellular communication system comprises a management function having a broadcast mode function; a plurality of wireless serving communication units operably coupled to the management function; and a plurality of wireless subscriber communication units receiving signals from the wireless serving communication units in an uni-cast mode of operation on a frequency channel comprising a plurality of downlink transmission resources. The broadcast mode function signals and applies a common cell identifier associated with broadcast transmissions from the plurality of wireless serving communication units thereby signalling to the plurality of wireless subscriber communication units that part or all of the transmission resource is to be configured for broadcast mode of operation.

In arranging the broadcast mode function to apply a common cell identifier associated with broadcast transmissions to be used on a plurality of cells and therefore via a plurality of respective wireless serving communication units, one embodiment of the invention avoids handover of communication when a wireless subscriber communication unit receiving only broadcast communications roams from one wireless serving communication unit to another.

The invention may allow improved use of the communication resource in the communication system, for example by more efficient use of the downlink resource to reflect user's needs. The invention may allow improved performance as perceived by the end-users for example by reduced interruption of downlink broadcasts when roaming. The invention may provide increased throughput rates, for example, due to a reduction in handover signalling. The invention may allow improved performance in a cellular network by allowing the wireless subscriber units to receive a stronger desired broadcast signal and a weaker interference signal.

The invention may allow a cellular communication system to dynamically use its resources for either broadcast or uni-cast services as required at any time. The invention may be compatible with some existing communication systems, such as 3GPP TD-CDMA or TD-SCDMA cellular communication systems.

According to an optional feature of the invention, the common cell identifier may be signalled to the plurality of wireless subscriber communication units via system information transmit from at least one wireless serving communication unit on a beacon timeslot. Thus, in-band signalling of a broadcast communication resource is achieved.

According to an optional feature of the invention, the common cell identifier may be signalled to the plurality of wireless subscriber communication units via system information transmit from at least one wireless serving communication unit on an 'out-of-band' frequency carrier, for example a GPRS, infra-red, Bluetooth™ or other radio access technology supported by the wireless subscriber communication units.

According to an optional feature of the invention, the common cell identifier may be transmitted on all timeslots on a particular frequency carrier, thereby configuring the cell as a 'true' broadcast communication cell.

According to an optional feature of the invention, the common cell identifier may be used to configure or re-configure all cells to transmit exactly the same signal thereby making the transmission of the broadcast signal more efficient. In this manner, the multiple cells transmitting the broadcast signal are 'seen' as a single composite cell at the wireless subscriber communication unit with a greater signal power and reduced interference.

According to a second aspect of the invention, there is provided a management function. The management function comprises a broadcast mode function for a cellular communication system, wherein the management function is arranged to be operably coupled to a plurality of wireless serving communication units supporting communication in an uni-cast mode of operation, and in turn to a plurality of wireless subscriber communication units on a frequency channel comprising a plurality of downlink transmission resources. The broadcast mode function applies a common cell identifier associated with broadcast transmissions from the plurality of wireless serving communication units thereby signalling to the plurality of wireless subscriber communication units that part or all of the transmission resource is to be configured or re-configured for broadcast mode of operation.

According to a third aspect of the invention, there is provided a method of configuring a cellular communication system. The cellular communication system comprises a management function having a broadcast mode function and a plurality of wireless serving communication units operably coupled to the management function. A plurality of wireless subscriber communication units is supported in time division duplex wireless communication by respective wireless serving communication units. One or more of the plurality of wireless subscriber communication units receive signals from the at least one of the plurality of wireless serving communication units on a frequency channel comprising a plurality of downlink transmission resources in an uni-cast mode of operation. A common cell identifier associated with broadcast transmissions is used to signal to the plurality of wireless subscriber communication units that part or all of the transmission resource is to be configured or re-configured for broadcast mode of operation.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

The following description focuses on embodiments of the invention applicable to a UMTS (Universal Mobile Telecommunication System) cellular communication system and in particular to a UMTS Terrestrial Radio Access Network (UTRAN) operating in a Time Division Duplex (TDD) mode within a $3^{rd}$ generation partnership project (3GPP) system. However, it will be appreciated that the invention is not limited to this particular cellular communication system, but may be applied to other TDD-based cellular communication systems.

Figure 1:
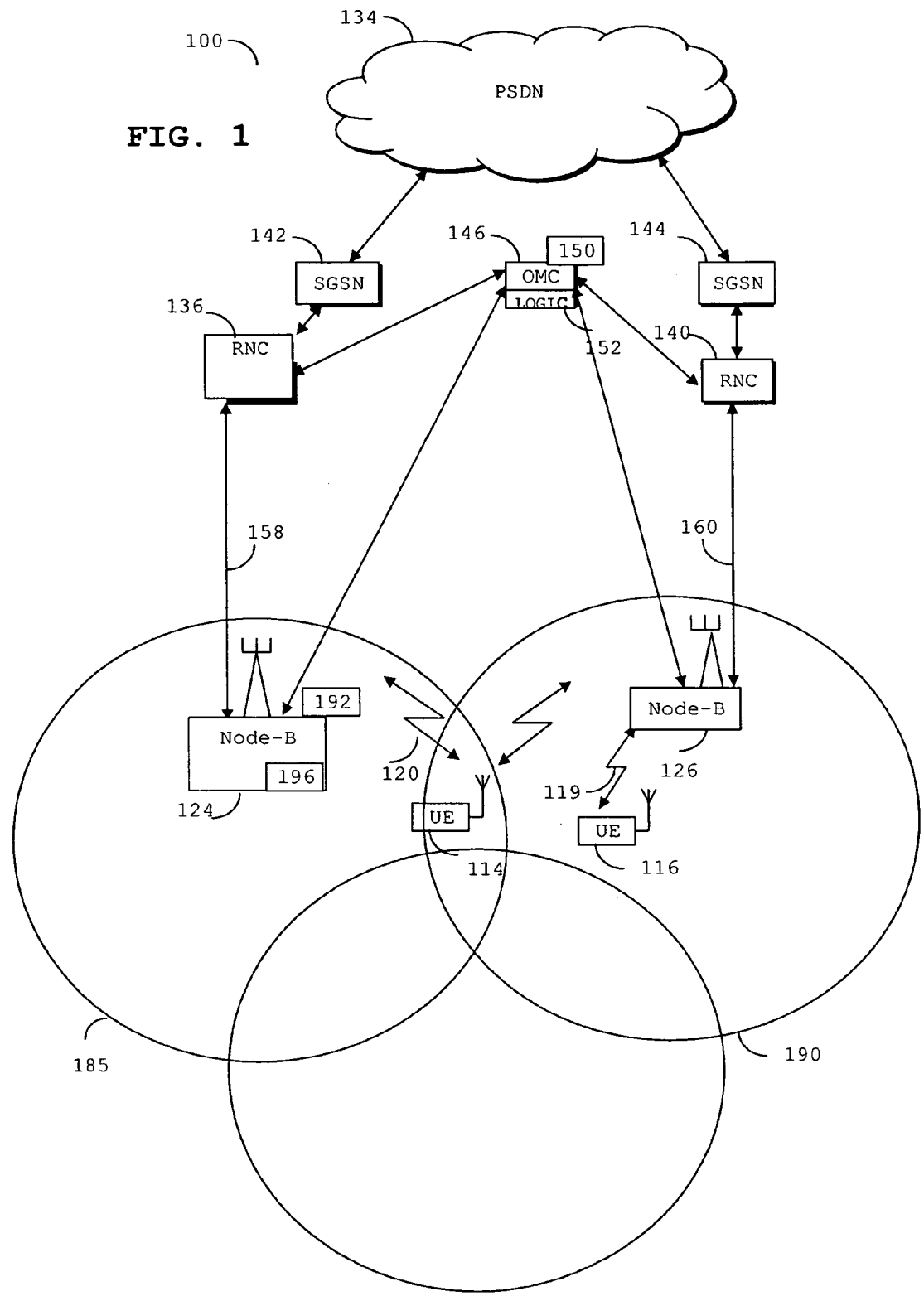
FIG. 1 illustrates a 3GPP cellular communication system adapted in accordance with some embodiments of the present invention.

Referring now to FIG. 1, a cellular-based communication system 100 is shown in outline, in accordance with one embodiment of the present invention. In this embodiment, the cellular-based communication system 100 is compliant with, and contains network elements capable of operating over, an universal mobile telecommunication system (UMTS) air-interface. In particular, the embodiment relates to the Third Generation Partnership Project (3GPP) specification for wide-band code-division multiple access (WCDMA), time-division code-division multiple access (TD-CDMA) and time-division synchronous code-division multiple access (TD-SCDMA) standard relating to the UTRAN radio Interface (described in the 3GPP TS 25.xxx series of specifications).

In particular, the 3GPP system is adapted to support both broadcast and uni-cast UTRA communication from one or more cells.

A plurality of wireless subscriber communication units/terminals (or user equipment (UE) in UMTS nomenclature) 114, 116 communicate over radio links 119, 120 with a plurality of base transceiver stations, referred to under UMTS terminology as Node-Bs, 124, 126. The system comprises many other UEs and Node-Bs, which for clarity purposes are not shown.

The wireless communication system, sometimes referred to as a Network Operator's Network Domain, is connected to an external network 134, for example the Internet. The Network Operator's Network Domain includes:
(i) A core network, namely at least one Gateway General Packet Radio System (GPRS) Support Node (GGSN) (not shown) and at least one Serving GPRS Support Nodes (SGSN) 142, 144; and
(ii) An access network, namely:
(i) A UMTS Radio network controller (RNC) 136, 140; and
(ii) A UMTS Node-B 124, 126.

The GGSN (not shown) or SGSN 142, 144 is responsible for UMTS interfacing with a Public network, for example a Public Switched Data Network (PSDN) (such as the Internet) 134 or a Public Switched Telephone Network (PSTN). The SGSN 142, 144 performs a routing and tunneling function for traffic, whilst a GGSN links to external packet networks.

The Node-Bs 124, 126 are connected to external networks, through Radio Network Controller stations (RNC), including the RNCs 136, 140 and mobile switching centres (MSCs), such as SGSN 144. A cellular communication system will typically have a large number of such infrastructure elements where, for clarity purposes, only a limited number are shown in FIG. 1.

Each Node-B 124, 126 contains one or more transceiver units and communicates with the rest of the cell-based system infrastructure via an $I_{ub}$ interface, as defined in the UMTS specification.

In accordance with one embodiment of the present invention, a first wireless serving communication unit (e.g. Node-B 124) supports TDD operation on a frequency channel comprising a plurality of uplink transmission resources divided into uplink timeslots and a plurality of downlink transmission resources divided into downlink timeslots. Node-B 124 supports communication over geographic area 185.

In accordance with one embodiment of the present invention, a second wireless serving communication unit (i.e. Node-B 126) supports TDD operation on a second frequency channel comprising a plurality of uplink second transmission resources divided into uplink timeslots and a plurality of downlink second transmission resources divided into downlink timeslots. Node-B 126 supports communication over geographic area 190.

Each RNC 136, 140 may control one or more Node-Bs 124, 126. Each SGSN 142, 144 provides a gateway to the external network 134. The Operations and Management Centre (OMC) 146 is operably connected to RNCs 136, 140 and Node-Bs 124, 126. The OMC 146 comprises processing functions (not shown) and logic functionality 152 in order to administer and manage sections of the cellular communication system 100, as is understood by those skilled in the art.

In accordance with one embodiment of the present invention, the OMC 146 (or equivalent Network Element Manager or controller with similar functionality) has been adapted as described below. Hereafter, this 'central' management entity of the wireless communication system will be referred to as a 'management function'. The management function 146 communicates with one or more RNCs 136, 140, which in turn provide the signalling 158, 160 to the Node-Bs and to the UEs regarding radio bearer setup, i.e. those physical communication resources that are to be used for broadcast and uni-cast transmissions.

In accordance with one embodiment of the invention, the management function 146 has been adapted to comprise, or be operably coupled to, a broadcast mode function 150. The broadcast mode function 150 comprises means for signalling to the plurality of wireless subscriber communication units that part or all of the transmission resource in the cellular communication system 100 is to be configured or re-configured for broadcast mode of operation. The broadcast mode of operation is arranged to be in addition to, or as an alternative to, uni-cast transmissions.

In one embodiment of the present invention, a wireless serving communication unit, such as a Node-B, comprises a transmitter that is operably coupled to a processor 196 and a timer function 192. Embodiments of the invention utilize the processor 196 and timer function 192 to configure or re-configure transmissions from the Node-B 124 in a broadcast mode.

The processor 196 supports downlink broadcast transmissions in addition to, or as an alternative to, uni-cast transmissions in either or both of the downlink and uplink channels of the communication system.

The timer function 192 is configured to schedule complete timeslots as broadcast transmissions, under the guidance/instruction of the broadcast mode function 150. In one embodiment, the broadcast mode function 150 may schedule special broadcast timeslots in addition to uni-cast transmissions.

The broadcast mode function 150 is configured to manage the physical resources that are signaled to the RNCs and the Node Bs. In this manner, the broadcast mode function 150 allocates timeslots for broadcast, sets transit powers and allocates a single cell ID for all timeslots that are to carry broadcast transmissions.

In UTRA TDD, the concept of a single cell identifier is known, whereby a number of identifiers are configured to identify a respective individual cell. In accordance with one embodiment of the invention the 'single cell identifier' is modified and used as a 'common cell' identifier that is applied across multiple cells.

Notably, the cell identifier is a parameter that may be set within the smallest possible time allocated resource unit, for example on a per timeslot basis in a 3GPP TDD scenario. Thus, for broadcast timeslots all cells in the 3GPP TDD network would be signalled using the same identifier; whilst for non-broadcast timeslots a traditional non-overlapping pattern of cell identifiers would be used.

It is envisaged that the broadcast mode function 150 may also be operably coupled to, or located within, other architecture elements within the network, such as RNC 136, 140 or, say, Node-B 124. It is envisaged that the broadcast mode function 150 may be distal from the OMC 146 and/or its functionality may be distributed between a number of system elements.

In accordance with one embodiment of the present invention, it is proposed that the broadcast mode function 150 allocates a data field in the existing UTRA signalling to support combined broadcast and uni-cast transmissions. In this embodiment, as illustrated in the cell diagram 200 of FIG. 2, a common cell-ID 215 is used to signify broadcast transmission in one or a plurality of available timeslots across a number of cells 210 supporting broadcast transmissions.

Currently in UTRA TDD, each Node B is signalled with the cell ID that it is to apply to all of its timeslots. The UEs derive the cell ID as part of their synchronisation procedure (i.e. UEs require the cell ID to decode the transmissions), which is then used to decode all of the timeslots. In the context of the aforementioned broadcast implementation, the cell ID of the timeslot containing the synchronisation burst—usually the beacon timeslot—is derived in the usual manner, i.e. via the synchronisation procedure. However, once the common cell ID has been decoded, the UE will decode the broadcast control channel (BCCH) and extract system information therefrom. Included within the system information is additional signalling (i.e. additional to the current UTRA TDD) that informs the UE of those timeslots that are broadcast, and hence those timeslots to use the common cell ID parameter in order to decode the broadcast transmissions.

Figure 2:
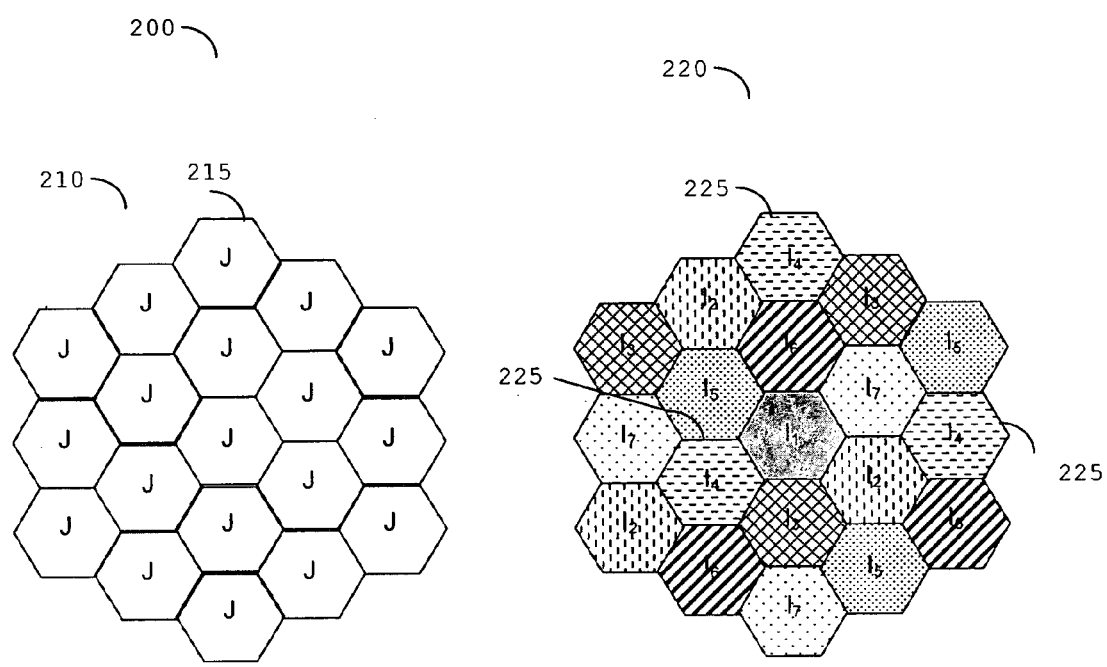
FIG. 2 illustrates cell ID allocation in a UTRA-TDD network for both standard uni-cast transmissions as well as combined broadcast and uni-cast transmissions in accordance with some embodiments of the invention.

FIG. 2 illustrates the broadcast transmissions being performed in all cells, using the common cell-ID 215. However, it is envisaged in another embodiment that clusters of cells may be configured or re-configured to support broadcast transmissions, in contrast to re-configuring all cells. In this manner, the cellular system supports a common cell-ID broadcast network.

It can be further understood that, in some instances, all of the time portion may be dedicated to broadcast transmissions. For example, with reference to the embodiment of UTRA TDD (but not limited to this case), all timeslots may be used to carry broadcast signals, i.e. with this embodiment a common cell ID can be allocated in all of the timeslots. This broadcast mode of operation, using a single cell ID, provides particular advantages where a wireless communication unit is roaming between coverage areas where uni-cast communication was previously supported by alternative Node Bs. In effect, the use of a common cell ID enables the roaming wireless communication unit to avoid a need to perform 'handover' type procedures for reception of broadcast transmissions when roaming from the coverage region of one cell to another.

With respect to one embodiment of the present invention, the ratio of timeslots used for uni-cast and broadcast transmissions may be configured as flexible and can be dynamically altered by the broadcast mode function 150 located within, or operably coupled to the management function 146. This may be signalled either in-band, i.e. using one of the UTRA-TDD signalling channels, or out of band, i.e. using some other radio access technology such as GPRS or UTRA-FDD for example. In this case, where system resources are divided between uni-cast and broadcast modes of operation, handover functionality is still required and may be signalled, say, on a common control channel. A common control channel is selected as it is a cell-wide transmission that is intended to provide useful system information to all UEs connected to a particular cell.

Consequently flexible broadcast deployments can be planned where, for instance, the number of broadcast timeslots is changed either on a network by network approach at deployment or based upon some other criteria such as user demand, time of day etc. For instance it may be that more timeslots are used to convey broadcast channels in the evening, whilst during the day it may be that fewer timeslots are required for broadcast and more are required for uni-cast services, such as voice telephony, broadband data applications, etc. Thus, the OMC utilises the system information that can be obtained from various locations within the system or supported by the system (such as scheduling of transmissions), and via various means, as known to those skilled in the art.

As such the number of timeslots used for broadcast transmissions can be understood to vary from '0' (no broadcast transmissions) to '15' (i.e. the maximum number of timeslots in a radio frame in UTRA TDD). In the latter example, as all available timeslots are used for broadcast transmissions, then any additional signalling required for, say, registration and authentication could be carried on a separate radio access technology (e.g. GPRS or UTRA-FDD, for example) or on the same radio access technology but at a separate carrier frequency or on an alternative TDD carrier. Thus, with all '15' timeslots used for broadcast services the UTRA-TDD carrier could be considered an additional cellular network (or carrier frequency) used in conjunction with an existing cellular network (or carrier frequency) as a dedicated broadcast carrier.

Even in such a dedicated broadcast mode of operation, it is envisaged that certain uni-cast transmissions may still be performed, from time to time, for example to aid with authentication or registration. However, it will be appreciated that these can be performed 'out-of-band', for example using another cellular network access technology, such as GPRS, FDD, etc. Alternatively, it is envisaged that the signalling may be carried out 'in-band' on the same TDD carrier with different allocated timeslots.

With regards to the receiver configuration, it is envisaged that, in the case of 'out-of-band' signalling then the terminal will likely, but not necessarily, be configured as a dual-mode device, i.e. TDD/FDD or TDD/GPRS etc.

Thus, in this aspect of the invention and with reference to UTRA TDD, all of the timeslots within a radio frame are dedicated to broadcast transmissions, whilst any point-to-point transmissions required are carried on another radio access technology.

The common cell-ID 215 in FIG. 2 is used in contrast to the known use of a single cell-ID re-use pattern 220 for uni-cast timeslots 225. Basically, in UTRA TDD there is a one-to-one mapping between the cell ID and the scrambling code, and also between the cell ID and the basic midamble code used. Thus, effectively, the cell ID is a mechanism by which a subscriber unit is able to differentiate between different cells in the network.

If uni-cast and broadcast transmissions are segregated into different timeslots, in an UTRA-TDD network as shown in the left hand side of FIG. 2, then a common cell parameter ID (denoted 'J') may be used across the network for all broadcast timeslots. This is in contrast to a 'conventional' uni-cast single cell parameter ID reuse plan (for example using seven cell parameter IDs denoted $I_1, I_2, \ldots, I_7$) 225, as shown in the second cell configuration 220 of FIG. 2.

In an UTRA TDD network, the cell parameter ID determines the spreading sequences (through control of the cell ID specific scrambling sequence applied to the orthogonal variable spreading factor (OVSF) channelisation codes) and the pilot/midamble sequences used for transmission in a cell. Thus, configuring all cells in the network to use the same cell parameter ID will ensure that the same spreading codes are used throughout the network in broadcast timeslots, and hence exactly the same signals will be transmitted from all cell transmitters in the network.

Furthermore, the use of a common cell ID parameter for all broadcast timeslots in the network ensures that a common set of pilot/midamble sequences, used for channel estimation, are also used in these timeslots. In this manner, provision of a common cell ID allows reception of combined signals from multiple cell transmitters. Hence, a simple receiver architecture, which would typically be employed for detection of signals from a single source only, can be used to receive the same signal from multiple sources. It will be understood that, in this regard, the receiver at the wireless subscriber unit would be designed to cope with the time dispersion associated with receiving multiple identical transmissions from different wireless serving communication units.

Thus, in this embodiment of the invention the cellular network, or carrier of a network, carrying broadcast transmissions is configured as a dedicated broadcast transmission network/carrier. All additional receiver functionality to accommodate uni-cast transmission is performed using another radio access technology or the same radio access technology but on a separate carrier frequency. Thus, in this embodiment, a dual mode device will be used. However, it is envisaged that the device does not necessarily have to have full dual-mode functionality.

Figure 3:
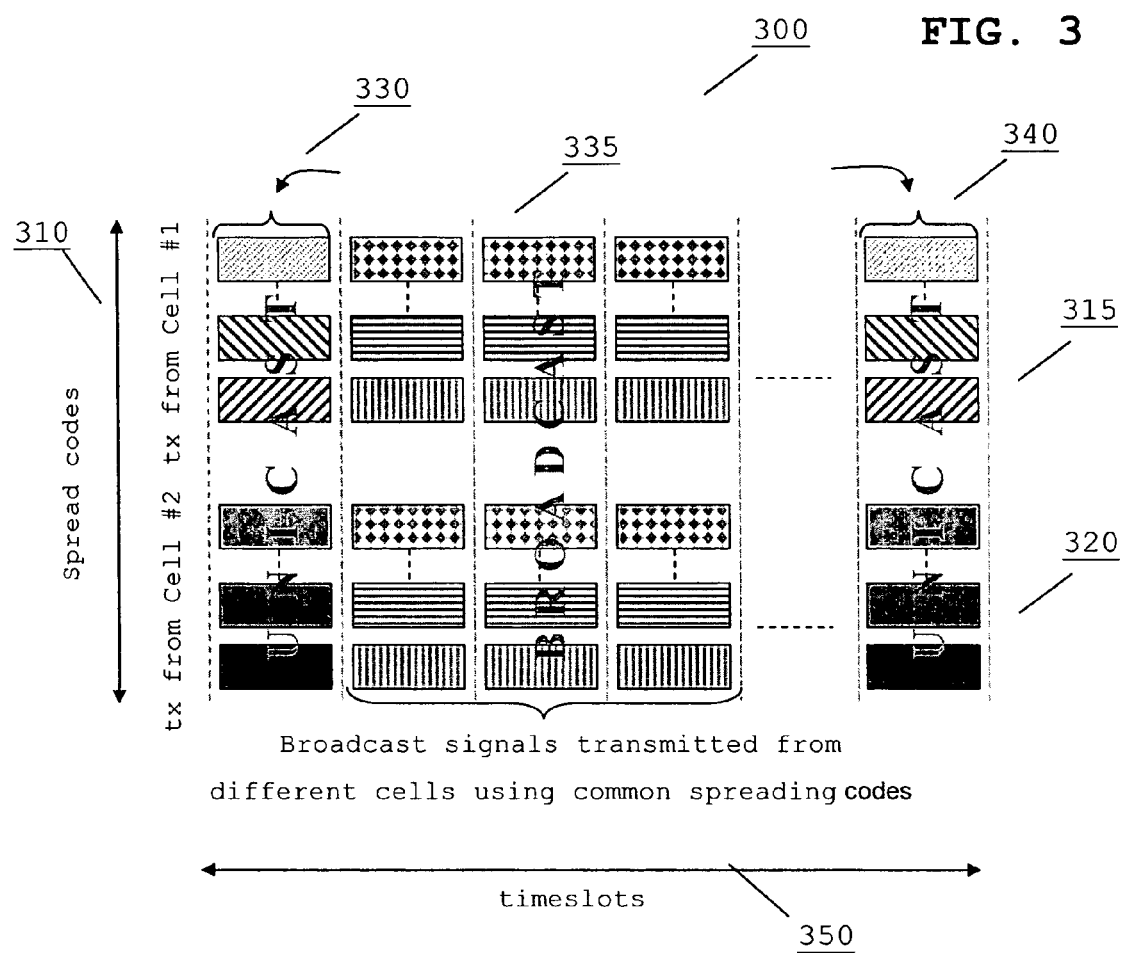
FIG. 3 illustrates a code versus timeslot diagram for a TD-CDMA cellular system, such as UTRA-TDD, in accordance with some embodiments of the invention.

In a further embodiment of the present invention, a partition of the physical resources between uni-cast and broadcast transmissions may be introduced, as illustrated in the conceptual diagram 300 of FIG. 3. In this embodiment of the present invention, the cellular network delivers downlink broadcast services 335 in addition to uni-cast services 330, 340 provided in both uplink and downlink directions.

Notably, whilst uni-cast services 330, 340 are delivered over non-overlapping physical resources in adjacent cells, as in conventional cellular systems, broadcast services 335 are also transmitted simultaneously, i.e. in the same timeslots 350 using identical physical resources in multiple cells. The broadcast services 335 are provided simultaneously by either all cells in the network, or by a cluster of cells in close proximity to one another.

For example, in one embodiment in a TD-CDMA based cellular system, such as UTRA-TDD, the broadcast services are transmitted over the entire network or over a cluster of cells using the same spreading code(s) 310, whilst uni-cast traffic is transmitted using other distinct spreading codes in adjacent cells. In a 3GPP context, the spreading codes may be classified as identical or distinct by their combination with identical or distinct cell scrambling codes (controlled via the common cell ID).

In an enhanced embodiment, it is envisaged that the portion of time used for uni-cast and broadcast transmissions from a network is dynamically controllable by the broadcast mode function and may vary. Advantageously, the timing of these transmissions will also be signalled to the wireless subscriber communication units. In this manner, the use of broadcast transmissions over the conventional cellular network can be increased or decreased dependent upon the prevailing conditions, such as time of day, number of active users, active user profiles, services being supported, etc.

In yet another embodiment of the present invention, broadcast and uni-cast transmissions may be allocated in different timeslots 350 in UTRA TDD (or 'sub-frames' in proposed long term evolutions to the UTRA standard), as also illustrated in FIG. 3. This reduces the interference experienced by the mobile receiver whilst receiving and detecting broadcast signals. FIG. 3 shows uni-cast services 330, 340 and common broadcast services 335 transmitted from a first UTRA-TDD cell 315 and a second UTRA-TDD cell 320. The first and the last timeslots are used for uni-cast transmissions 330, 340 while broadcast signals 335 are transmitted on the three timeslots in the middle. A number of data bursts, depicted in FIG. 3 by rectangular blocks, are transmitted in each timeslot. In the uni-cast transmission 330, 340, each cell uses a distinct set of spreading codes 310 to transmit multiple bursts within a timeslot. On the other hand, bursts carrying common broadcast signals 335 are transmitted from both cells 315, 320 using identical sets of spreading codes 310. Again, it is envisaged that the aforementioned use of spreading codes can apply to the case where the spreading codes are identical but have been modified by use of the scrambling code, such as the use in a 3GPP context, where the scrambling code may be different per cell.

Figure 4:
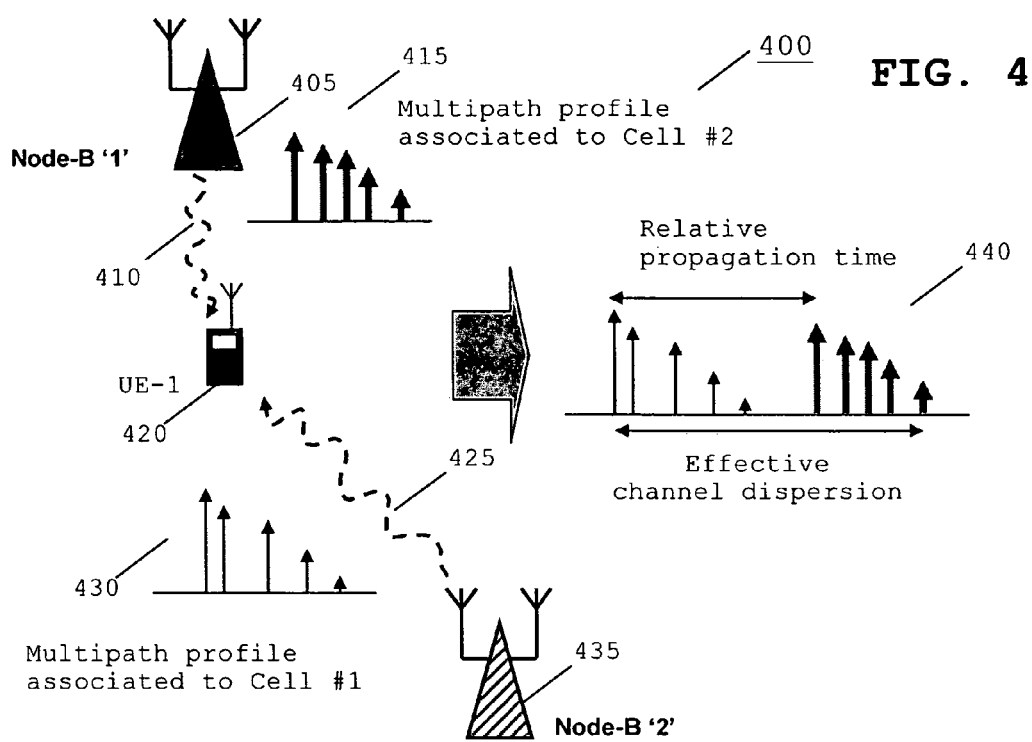
FIG. 4 illustrates equivalent channel profiles associated with broadcast signals from two Node-Bs in accordance with some embodiments of the invention.

From a wireless subscriber communication unit's perspective, receiving broadcast signals 335 transmitted from multiple cells 315, 320 is equivalent to receiving a single higher power signal transmitted from a single cell that has been through a more dispersive channel 415, 430 (due to different propagation delays from neighbouring cells), as shown in FIG. 4.

In the conceptual diagram 400 illustrated in FIG. 4 the wireless subscriber communication unit (mobile terminal) 420 receives broadcast signals from a first Node B 405 operating in a first cell (Cell#1) 315, which is located adjacent to, or neighbouring, a second Node-B 435 operating in a second cell (Cell#2) 320, which is located further away from the wireless subscriber communication unit 420. The channels connecting both Cell#1 and Cell#2 to the wireless subscriber communication unit 420 are temporally dispersive, as indicated by their respective channel impulse responses 415, 430. To the wireless subscriber communication unit, the broadcast signal appears to have been through an effective channel whose impulse response is a combination of the two channel responses 440, separated by the relative propagation time between Cell#1 and Cell#2.

The wireless subscriber communication unit 420 is able to combine broadcast signals transmitted from a plurality of cells by performing a simple detection process, identical to the process used to detect uni-cast signals, as known to those skilled in the art.

A simple detection process is less complex and provides significantly better performance than known explicit signal combining techniques, where different physical resources are transmitted from a number of the plurality of cells. Since, typically, broadcast signals arriving from multiple cells appear to have passed through a more dispersive channel 440 (relative to signals arriving from a single cell 415 or 430) the wireless subscriber communication unit receiver is only needed to be designed such that it is able to tolerate higher multi-path delays.

As a consequence, there is no longer a need for a complex receiver architecture or multiple receivers with signal combining circuitry. Thus, the wireless subscriber communication unit receiver is designed to tolerate a certain multipath delay, whether this is due to temporal dispersion from one transmission or due to multiple transmissions of the same signal from different transmitters.

Advantageously, in accordance with one embodiment of the present invention, a conventional cellular network, which typically transmits different signals from each of the cells, can be configured or re-configured to operate in a broadcast, or pseudo-broadcast, mode of operation. In one embodiment, this is achieved by transmitting simultaneously the same data on the same physical resource (e.g. channelisation codes, scrambling codes, etc. of a UTRA-TDD system), with the same pilot sequence (midambles) from multiple cells.

In this manner, the number and position of, for instance, timeslots that carry broadcast transmissions across the cellular network can be signalled via suitable 'in-band' or 'out-band' signalling procedures. By receiving the signalling, the mobile terminal's receiver is able to configure its receiver architecture according to its requirement for broadcast or uni-cast transmissions, for respective portions of time.

Figure 5:
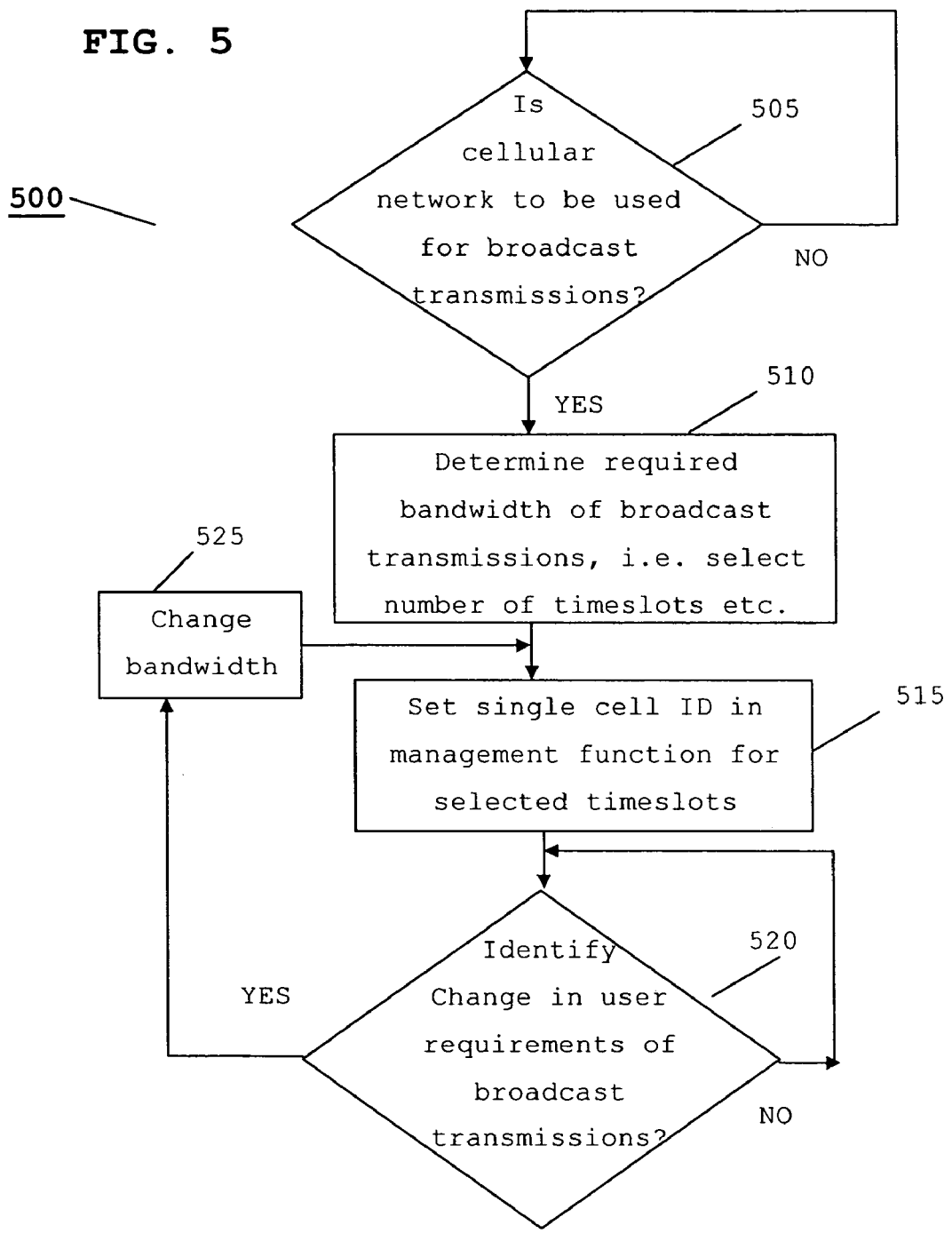
FIG. 5 illustrates a method of employing a combined broadcast and uni-cast operation in a cellular system in accordance with some embodiments of the invention.

Referring now to FIG. 5, a flowchart 500 illustrates a method of operating an uni-cast cellular system to additionally, or alternatively, operate in a broadcast mode of operation. At some point, for example at initial deployment or at a later stage in the use of the network, a decision is made for the network to be used to support broadcast transmissions, as shown in step 505.

If the answer is 'YES', in step 505, then a determination of the required bandwidth of the broadcast transmission is made, as shown in step 510. This determines, amongst other parameters, how many timeslots are required for the broadcast transmission. The broadcast mode function then sets a common cell ID for the selected timeslots, as shown in step 515. This is signalled to the Radio Network Controller, which in turn signals the information to the Node-Bs and the UEs.

It is also envisaged that the bandwidth of the broadcast transmission can be dynamically adjusted by the network side (e.g. the OMC) as it is a broadcast service. In this manner, more slots may be allocated to broadcast transmissions during peak times or as a result of news events, etc., as in step 525, or following a determination that the broadcast transmission bandwidth is sub-optimal, in step 520. It is envisaged that a change of bandwidth in the system for broadcast transmissions may also result in an alteration of the number of timeslots needed, and hence signalled, for common cell ID use.

It is noteworthy that the above embodiments, which propose use of a common cell ID to identify broadcast transmissions, are not supportable within the present UTRA TDD standard, i.e. the standard requires amending to support the additional signalling required by the above embodiments. Thus, there has been no provision for such a service.

It will be appreciated that, for clarity purposes, the above description has described embodiments of the invention with reference to different functional units and processors. However, it will be apparent that any suitable distribution of functionality between different functional units or processors, for example with respect to the broadcast mode function, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although one embodiment of the invention describes broadcast mode for UTRA TDD it is envisaged that the inventive concept is not restricted to this embodiment. In particular, for example, future evolutions of UTRA 3GPP (currently referred to as 'long term evolution' (LTE)) will also be divided into timeslots (or other such named time portions), and will therefore be able to benefit from the concepts described hereinbefore.

Delivering broadcast services over cellular networks, in the manner described above, is extremely attractive, for at least one or more of the following reasons:

(i) It provides a self-contained communication system, for example the signalling required (e.g. for encryption key exchange) and uplink data (e.g. to support interactive services) can be carried by the same system that is used to deliver the downlink broadcast service.

(ii) It allows a cellular operator to reuse existing uni-cast infrastructure to provide a dynamic 'broadcast/uni-cast' combination service.

(iii) Improved spectral-efficiency of a cellular communication system can be achieved by delivering a combination of broadcast and uni-cast services.

(iv) It allows a cellular operator to use spectrum that they already own for a new service, thereby facilitating a new revenue stream from their users.

(v) It significantly reduces the cost of the wireless subscriber communication unit if both broadcast and 'conventional' uni-cast services are delivered over the same (or compatible) radio access technologies.

(vi) A wireless subscriber communication unit receiving in timeslots allocated for broadcast transmission sees a much stronger composite broadcast signal sent from several cells, instead of a single cell transmission with several interfering transmissions from other cells (and hence other cell IDs). Thus, the SNR seen in the broadcast timeslots is improved thereby facilitating higher sustainable throughput rates. Thus, the inventive concept provides a more efficient mechanism for delivering broadcast content to the wireless subscriber units.

(vii) A yet further advantage is that one embodiment of the invention uses a radio access technology that is divided into timeslots, such as UTRA TDD or 3GPP LTE. Thus, when configuring or re-configuring the communication system to operate in a broadcast mode or a partial broadcast mode of operation, it is possible to exploit the inherent timeslot nature to provide 'discontinuous' reception, i.e. some timeslots can be used whilst others are not. In this manner, a significant conservation in the battery life of the wireless subscriber communication unit can be achieved, when compared with, say, applying the same principal to a WCDMA network.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

We claim:

1. A cellular communication system comprising:
   a management function having a broadcast mode function;
   a plurality of wireless serving communication units operably coupled to the management function and supporting communication in a plurality of communication cells; and
   a plurality of wireless subscriber communication units receiving signals from respective wireless serving communication units in an uni-cast mode of operation on a frequency channel comprising a plurality of downlink transmission resources;
   wherein the broadcast mode function applies a common cell identifier associated with a broadcast transmission across the plurality of communication cells to the plurality of wireless serving communication units and comprises means for signalling to the plurality of wireless subscriber communication units that part or all of the downlink transmission resource is to be configured or re-configured for broadcast mode of operation using the common cell identifier.

2. The communication system of claim 1, wherein the plurality of wireless serving communication units transmit the broadcast signal such that a composite broadcast signal is received by at least one of the plurality of wireless subscriber communication units from the plurality of wireless serving communication units.

3. The communication system of claim 1, wherein the broadcast mode function is configured to select a ratio of available resource between uni-cast and broadcast communications to be supported by one or more of the plurality of wireless serving communication units.

4. The communication system of claim 3, wherein the broadcast mode function is configured to dynamically alter the ratio in response to one or more of the following: user demand, time of day, number of active users, active user profiles, services being supported.

5. The communication system of claim 1, wherein the common cell identifier is signalled to the plurality of wireless subscriber communication units via system information transmitted from at least one wireless serving communication unit on a common control channel.

6. The communication system of claim 1, wherein a number of the plurality of downlink transmission resources comprise downlink timeslots and the broadcast mode function configures or re-configures the operation of the communication system in a discontinuous mode.

7. The communication system of claim 1, wherein the management function allocates the common cell identifier to all of the downlink transmission resource thereby configuring or re-configuring one or more of the plurality of wireless serving communication units to support broadcast communication.

8. The communication system of claim 1, wherein a wireless subscriber communication unit of the plurality of wireless subscriber communication units is configured to block a re-registration process to a different wireless serving communication unit when roaming between respective geographic areas when solely receiving broadcast communication.

9. The communication system of claim 1, wherein the communication system is a 3rd Generation Partnership Project (3GPP) cellular communication system.

10. The communication system of claim 1, wherein the communication system is a time division duplex code division multiple access cellular communication system.

11. A wireless serving communication unit adapted to operate in the communication system of claim 1.

12. A management function adapted to operate in the communication system of claim 1.

13. A wireless subscriber communication unit adapted to operate in the communication system of claim 1.

14. A management function for a cellular communication system arranged to be operably coupled to a plurality of wireless serving communication units supporting communication in a plurality of communication cells in an uni-cast mode of operation to a plurality of wireless subscriber communication units on a frequency channel comprising a plurality of downlink transmission resources, wherein the management function comprises:
   a broadcast mode function that applies a common cell identifier associated with a broadcast transmission across the plurality of communication cells to the plurality of serving communication units; and
   means for signalling to the plurality of wireless subscriber communication units that part or all of the downlink transmission resource is to be configured or reconfigured for broadcast mode of operation using the common cell identifier.

15. The management function of claim 14, wherein the broadcast mode function is configured to send a broadcast signal via the plurality of wireless serving communication units to at least one of the plurality of wireless subscriber communication units.

16. The management function of claim 14, wherein the broadcast mode function selects a ratio of available resource between uni-cast and broadcast communications to be supported by one or more of the plurality of wireless serving communication units.

17. The management function of claim 16, wherein the broadcast mode function dynamically alters the ratio in response to one or more of the following: user demand, time of day, number of active users, active user profiles, one or more supported services.

18. The management function of claim 14, wherein the broadcast mode function signals the common cell identifier to the plurality of wireless subscriber communication units via system information transmitted from at least one wireless serving communication unit on a common control channel.

19. The management function of claim 14, wherein a number of the plurality of downlink transmission resources comprise downlink timeslots and the broadcast mode function configures or re-configures the communication system to a discontinuous mode of operation.

20. The management function of claim 14, wherein the management function allocates the common cell identifier to all of the downlink transmission resource to configure or re-configure one or more wireless serving communication units to support broadcast communication.

21. The management function of claim 14, wherein the management function is arranged to support 3rd Generation Partnership Project (3GPP) communication.

22. The management function of claim 14, wherein the communication system is a time division duplex code division multiple access cellular communication system.

23. A method of configuring a cellular communication system comprising a management function having a broadcast mode function, the method comprising:
   supporting communication across a plurality of communication cells by a plurality of serving communication units to at least one of a plurality of wireless subscriber communication units on a frequency channel comprising a plurality of downlink transmission resources in an uni-cast mode of operation;
   applying a common cell identifier associated with a broadcast transmission across the plurality of communication cells to the plurality of serving communication units; and
   signaling to at least one of the plurality of wireless subscriber communication units that part or all of the downlink transmission resource is to be configured or re-configured for broadcast mode of operation using the common cell identifier.

24. The method of claim 23, the method further comprising receiving a composite broadcast signal at the at least one of the plurality of wireless subscriber communication units from the plurality of wireless serving communication units.

25. The method of claim 23, further comprising selecting a ratio of available resource between uni-cast and broadcast communications to be supported by one or more of the plurality of wireless serving communication units.

26. The method of claim 25, further comprising dynamically altering the ratio in response to one or more of the following: user demand, time of day, number of active users, active user profiles, services being supported.

27. The method of claim 23, wherein the common cell identifier is signalled to the plurality of wireless subscriber communication units via system information transmitted from at least one wireless serving communication unit on a common control channel.

28. The method of claim 23, wherein a number of the plurality of downlink transmission resources comprise downlink timeslots and the signalling comprises configuring or re-configuring the operation of the communication system in a discontinuous mode.

29. The method of claim 23, further comprising allocating the common cell identifier to all downlink transmission resource to configure or re-configure one or more wireless serving communication units to support only broadcast communication.

30. The method of claim 23, further comprising configuring or re-configuring an operation of a wireless subscriber communication unit to block a re-registration process to a different wireless serving communication unit when roaming between respective geographic areas supported by wireless serving communication units and solely receiving broadcast communication.

31. The method of claim 23, wherein the communication system is a 3rd Generation Partnership Project (3GPP) cellular communication system.

32. The method of claim 23, wherein the communication system is a time division duplex code division multiple access cellular communication system.

33. A non-transitory, tangible computer program product having executable program code stored therein for supporting communication in an uni-cast mode of operation to a plurality of wireless subscriber communication units on a frequency channel comprising a plurality of downlink transmission resources, the executable program code operable for, when executed at a management function:
   supporting communication across a plurality of communication cells by a plurality of serving communication units to at least one of a plurality of wireless subscriber communication units on a frequency channel comprising a plurality of downlink transmission resources in an unicast mode of operation;
   applying a common cell identifier associated with a broadcast transmission across the plurality of communication cells to the plurality of serving communication units; and
   signalling to at least one of the plurality of wireless subscriber communication units that part or all of the downlink transmission resource is to be configured or reconfigured for broadcast mode of operation using the common cell identifier.

* * * * *